3,264,334
CYCLOHEPTATRIENYL VANADIUM
TRICARBONYL
Robert P. M. Werner, Binningen, Basel-Land, Switzerland, assignor to Ethyl Corporation, New York, N.Y., a corporation of Virginia
No Drawing. Filed Apr. 23, 1962, Ser. No. 189,293
2 Claims. (Cl. 260—429)

This application is a continuation-in-part of application Serial No. 101,652, filed April 10, 1961, now abandoned, and a continuation-in-part of application Serial No. 83,870, filed January 23, 1961, now abandoned.

This invention relates to novel organometallic compounds and a process for their preparation. More particularly, this invention relates to certain organic vanadium tricarbonyl compounds. An object of this invention is to provide a novel class of organometallic compounds. A further object is to provide a process for the preparation of certain novel organic vanadium tricarbonyl compounds. Still another object is to provide an economical method of plating a variety of substrates with vanadium. Other objects will be apparent from the following discussion and claims.

This invention comprises cycloheptatrienyl vanadium tricarbonyl compounds. These compounds can be represented by the formula $$QV(CO)_3$$

wherein Q is a cycloheptatrienyl radical having from 7 to about 15 carbon atoms.

The compounds of this invention are prepared by a process which comprises reacting vanadium hexacarbonyl with an organic cycloheptatriene compound. The cycloheptatriene compounds employed do not contain any metallic constituents. It has been found that this preparation may be accomplished in a system where the only reactants are vanadium hexacarbonyl and the organic compound. However, in some instances a non-reactive solvent is efficaciously employed.

The temperatures employed in the process of this invention may vary over a wide range. In general, temperatures of from about 45° C. to 300° C. are employed. However, a preferred temperature range is from 50° C. to 165° C. as reactions conducted in this range lead to a high yield of products with a minimum of undesirable side reactions. Reaction times of from 10 minutes to 10 hours or longer may be employed. Ordinarily, heating periods of from 15 minutes to 7 hours are sufficient to produce a good yield of product. It is preferred that the temperature and the reaction time are compatible with the products and the reactants.

Cycloheptatriene is a conjugated cyclic hydrocarbon having 3 carbon-to-carbon double bonds in a 7-carbon atom ring. The compound has the formula $C_7H_8$. It can be represented by the following formula:

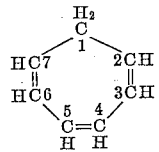

The cycloheptatriene compound which is a reactant in the process of this invention can be selected from a wide range of cycloheptatriene organic compounds.

Any or all of the carbon atoms in the above formula may be substituted by monovalent radicals containing from one to about eight carbon atoms. Typical monovalent radicals are alkyl, aryl, cycloalkyl, alkenyl, cycloalkenyl, aralkyl and alkaryl radicals. Examples of these radicals are the methyl, propyl, phenyl, tert-butyl, p-chlorophenyl, neo-pentyl, chloromethyl, octyl, cyclohexyl, propenyl, cyclopentyl, cyclopentenyl, cyclopropyl, 2-methyl-2-butenyl, cyclohexenyl, benzyl, 2-phenylethyl, p-ethylphenyl, 2,4-dimethylphenyl and tolyl radicals.

Preferred substituent groups are monovalent hydrocarbon groups containing from one to about seven carbon atoms. It is further preferred that the sum of the carbon atoms in all of the substituent groups does not exceed ten. When this preference is satisfied, the compounds are more readily available.

The applicable cycloheptatriene compounds include, for example, cycloheptatriene, 1-cycloheptatrienyl cycloheptatriene, 1-methylcycloheptatriene, 2-isopropylcycloheptatriene, 1,4-diethylcycloheptatriene, 4-phenylcycloheptatriene, 3-decylcycloheptatriene, 1-tert-butylcycloheptatriene, 1,3-diisopropylcycloheptatriene, 1-hydroxycycloheptatriene, 1-cycloheptatrienyl carboxylic acid propylester, 3-cycloheptatrienyl butylether, 2-N-ethylcycloheptatrienyl amine, 1-methylaminocycloheptatriene, 1-chlorocycloheptatriene, 3,5-di-methoxycycloheptatriene, 1-dicycloheptatriene, 3,5-dimethoxycycloheptatriene, 3 - isopropyl - 1-phenylmethoxymethylcycloheptatriene, 1-methyl-4-phenylcycloheptatriene, 3-cycloheptatriene, 1-methyl-4-phenylcycloheptatriene, 3-hydroxymethylcycloheptatriene, 1-cycloheptatriene carboxylic acid, 1-cycloheptatriene and the like. Those compounds composed entirely of carbon and hydrogen and having up to about 14 carbon atoms are preferred since they lead to more easily recoverable products and constitute the most readily available cycloheptatriene compounds.

Whereas the process of the present invention can be conducted at atmospheric pressure at the reflux temperature of the system, higher or lower temperatures and higher pressures may also be conveniently employed. In certain instances, it is desirable to conduct the reaction in the vapor phase by passing the vapor of the cycloheptatriene compound over the metal carbonyl in a hot tube. When the reaction is conducted at super-atmospheric pressure, temperatures of from 150° C. to 250° C. are preferred although temperatures outside this range may also be employed. Since carbon monoxide is a product of this reaction, and an excess of carbon monoxide pressure may inhibit further formation of the desired compound, it is advantageous to allow the excess carbon monoxide to escape from the reaction vessel.

No solvent is required in conducting the process of this invention if the cycloheptatriene compound is employed in excess. However, it is often convenient to employ an inert solvent. The solvent affords a homogenous reaction mixture and prevent local superheating and consequent destruction of the cycloheptatriene compound.

Saturated hydrocarbons are the preferred solvents. Other solvents which can be employed include ethers, aliphatic esters, silicone oils, aliphatic polyesters, and other liquids inert to the primary reactants and products. Examples of the compounds usable as solvents in the process of this invention include n-octane, n-nonane, n-decane and the various iso-decanes and other paraffinic hydrocarbons having up to about 20 carbon atoms, such as eicosane, octadecane, pentadecane and the like. Ether solvents which may be employed include ethyloctylether, amyl ethyl ether, ethyl heptylether and ethyl hexylether. Ester solvents which may be employed include pentyl 2-methylpropanoate, pentyl butanoate, butyl butanoate, γ-methylbutyl butanoate, ethyl decanoate, methyl decanoate, pentyl hexanoate, ethyl hexanoate and the like. Applicable silicone oils include copolymers and homopolymers of the various organosiloxanes and organosilanes having the appropriate boiling range. Examples of these are the dimethyl polysiloxanes, methylphenyl polysiloxanes, diphenyl polysiloxanes, di(chlorophenyl) polysiloxanes, hexaethyldisiloxane, hexapropyl disilane, diethyldipropyldiphenyldisilane and the like. The polyesters applicable as solvents in the process of this invention are completely esterified dicarboxylic acids. Esters may be employed derived from succinic, maleic, pyrotartaric, glutaric, adipic, pimelic, suberic, azelaic, sebacic and pinic acids, specific esters being di(1-methyl-4-ethyloctyl)glutarate, di(2-ethylhexyl)adipate, di(3-methylbutyl)azelate, di(2-ethylhexyl)azelate, di(2-ethylhexyl)sebacate, di(3,-5,5-trimethylhexyl)sebacate, di(2-ethylhexyl)maleate, di(methylcyclohexyl)adipate, 2 - ethylhexyl-1-methylheptyl sebacate, and the like.

The cycloheptatrienyl vanadium tricarbonyl compounds prepared by the process of this invention can be recovered by evaporation of the excess cycloheptatriene reactant and solvent. The compounds may be purified by recrystallization from solvents such as hydrocarbons or lower aliphatic ethers.

The following examples, in which all parts and percentages are by weight, are illustrative of the compounds of this invention and the process for their preparation.

EXAMPLE I

A mixture comprising 8.5 parts of vanadium hexacarbonyl, 18.4 parts of cycloheptatriene and 240 parts of n-hexane was stirred and heated at reflux (63 to 68° C.) for one hour under nitrogen. During this time, a large quantity of gas was evolved. The reaction mixture was then filtered while warm, using filter aid, under nitrogen, to give a green solution and a fine brownish precipitate which was washed several times with n-hexane. The green solution, including the washings, was reduced in volume under vacuum to about 25–30 ml., and on cooling in a dry ice acetone bath, shiny, brown black crystals were obtained. After two recrystallizations of the crystals from n-hexane, 1.9 parts of crystalline product was obtained. The moderately stable compound melted at 134–137° C., could be sublimed at 40–80° C. under vacuum and was found to be diamagnetic. On analysis there was found: C, 53.0; H, 3.44; V, 22.5. Calculated for $C_{10}H_7VO_3$: C, 53.12; H, 3.12; V, 22.54 percent. The molecular weight as determined by the Signer method was found to be 220. That calculated for $C_{10}H_7VO_3$, cycloheptatrienyl vanadium tricarbonyl, was 226.11. On the basis of the above analytical data and nuclear magnetic resonance data, the compound was unequivocally established as cycloheptatrienyl vanadium tricarbonyl.

EXAMPLE II

The procedure of Example I is followed except that octyl cycloheptatriene dissolved in diethyleneglycol dimethylether is used as the reactant. The product is octyl cycloheptatrienyl vanadium tricarbonyl.

EXAMPLE III

When methyl cycloheptatriene is substituted for the cycloheptatriene in Example I, the product is methylcycloheptatrienyl vanadium tricarbonyl.

EXAMPLE IV

When the procedure of Example I is followed except that chloromethylcycloheptatriene is used as the reactant and ligroin as the solvent, the product is chloromethylcycloheptatrienyl vanadium tricarbonyl.

EXAMPLE V

The procedure of Example I is followed except that 2,4-diethylphenyl cycloheptatriene is used as the reactant and n-hexane as the solvent. The product is 2,4-diethylphenyl cycloheptatrienyl vanadium tricarbonyl.

EXAMPLE VI

Trimethyl cycloheptatriene dissolved in n-nonane yields trimethylcycloheptatrienyl vanadium tricarbonyl when the procedure of Example I is followed.

EXAMPLE VII

The apparatus consists of a vessel equipped with heating means and a conduit for passing vapor into a thermal reactor tube which is also equipped with heating means. A cold trap for isolating reaction products is located downstream from the thermal reactor tube. The vessel is charged with a quantity of cycloheptatriene and the reactor tube is charged with vanadium hexacarbonyl. The system is flushed with nitrogen and the continuous flow of nitrogen is maintained above the cycloheptatriene to carry the cycloheptatriene vapor over the vanadium hexacarbonyl in the reactor tube. The reactor tube is heated and maintained at about 140° C. The cycloheptatriene is heated to the boiling point and the cycloheptatriene vapor is carried over the vanadium hexacarbonyl and contacted therewith. Cycloheptatrienyl vanadium tricarbonyl is isolated in the cold trap.

EXAMPLE VIII

*Vapor phase plating of a steel with cycloheptatrienyl vanadium tricarbonyl*

A suitable quantity of cycloheptatrienyl vanadium tricarbonyl is placed into a reservoir equipped with heating means. The reservoir is connected through a valve, to a plating chamber wherein the object to be plated, a steel plate, is supported. The steel plate is connected to a temperature measuring device. The plating chamber is equipped with an induction coil which surrounds the metal object to be plated. The plating chamber is connected to a cold trap downstream from the reservoir and the cold trap is connected to a vacuum pump. The system is evacuated to a pressure less than 0.2 mm. of mercury. The reservoir is sufficiently heated to volatilize the cycloheptatrienyl vanadium tricarbonyl and to provide a steady continuous evolution of that compound. The temperature of the steel plate is raised to 400–550° C.

Upon contact of the vapor with the hot steel plate, a metallic vanadium-containing deposit is deposited on the plate. The organic vapors resulting from the decomposition of the plating compound together with the unused plating compound are collected in the cold trap. The unused material is recovered by a suitable extraction and crystallization procedure and used in another run.

Any material which can withstand a temperature of 400° C. can be plated with a vanadium-containing deposit using this technique. Iron, cooper, bronze, brass, chromium and various porcelains and other ceramics can be coated.

As mentioned previously, an object of this invention is to provide an improved method for plating vanadium on a variety of substrates. A further object is to provide a more efficient and effective method for plating vanadium in an economical manner.

The above and other objects are accomplished by a process for plating vanadium metal upon a substrate which comprises thermally decomposing a vapor consisting essentially of a cycloheptatrienyl vanadium tricarbonyl in contact with said substrate wherein said process is conducted at a temperature of from about 200° C. to about 600° C., and at a pressure of from about 0.01 mm. to about 10 mm. of mercury. The objects set out hereinabove are further accomplished by a process for plating vanadium on a substrate which comprises heating said substrate to a temperature of between about 200° C. to about 500° C. and contacting a vapor consisting essentially of one of the compounds prepared by the process of this invention with said substrate wherein said contacting is carried out at a pressure of between about 0.01 mm. to about 10 mm. of mercury.

The deposition chamber pressure may range from about 0.001 mm. of mercury to about 30 mm. of mercury. The preferred pressure in the deposition chamber is from about 0.01 to about 10 mm. of mercury since better plates are obtained within this pressure range and transportation of the plating vapor is facilitated. The most preferred pressure range is from about 0.01 to about 0.5 mm. of mercury since better results are obtained within this range.

The temperature conditions coupled with pressure in the plating chamber forms the critical feature of the present process. Thus, where the temperature ranges from about 200° C. to about 600° C., preferably 400° C. to 550° C., and the pressure in the chamber ranges from about 0.01 to about 10 mm. of mercury, better plates are obtained having better adherence to the substrate and pinhole free surfaces.

In the process of this invention a carrier gas is not required or desirable. Generally carrier gases tend to react with the vanadium being plated to form carbides, nitrides or other products as the metal is deposited upon the substrate. Furthermore, carrier gases usually contain small amounts of impurities which ultimately affect the plating process. Hence, a carrier gas is not generally used in the process of this invention and is preferably avoided. However, under some circumstances, because of the more improved plates obtained by the unique combination of temperature and pressure conditions of this invention, carrier gases such as hydrogen, carbon dioxide, nitrogen and argon may be tolerated and used to facilitate the flow of the vaporized plating compound.

In initially vaporizing the plating compound prior to its use in the actual plating operation, temperatures from about 80° C. to about 200° C. may be used. It is preferred, however, to vaporize the cycloheptatrienyl vanadium tricarbonyl compound at temperatures from about 125° C. to about 200° C. The temperature used depends on the flow rate desired.

The flow rate of the vapor is dependent to a certain extent upon the amount of pressure in the plating chamber and the temperature to which the compound is subjected. Ordinarily, the flow rates of the plating compound employed vary from about 1 foot per minute to about 30 feet per second although faster or slower rates can be employed.

The time required to plate vanadium by the process of this invention varies over a wide range, depending on flow rate, desired coating thickness, deposition chamber pressure, temperature of the substrate and the vaporization temperature of the plating compound. However, times from about 15 minutes to about 10 hours are generally acceptable. For economic reasons, it is preferred, however, that the process time range from about 30 minutes to about 3 hours, depending on the desired thickness of the vanadium coating desired.

Adherent vanadium coatings can be obtained through depositing its vapor directly upon any substrate that can withstand the plating conditions. Typical examples of substrates which may be plated are nickel, pyrex glass, beryllium, molybdenum, graphite, ceramics, high temperature resistant plastics, and the like. The preferred substrates which can be plated are porcelains, nickel, ferrous metal substrates, aluminum and the like.

In some cases, the substrate to be plated is preferably subjected to initial preparation. This is especially true in the case of metal substrates. In other words, the degree of adherence achieved through the unique vapor plating process of this invention, in some instances where desirable, can be further improved by an appropriate metal surface pre-treatment. The best metal surface preparation is achieved through degreasing with a solvent such as 1,1,2-trichloroethylene or the like followed by light sand blasting. The vapor plated coatings have better adherence on slightly uneven surfaces, such as created by sandblasting, than on highly polished substrates. Thus, not desiring to be bound by theoretical considerations, it is felt that sandblasting permits a better anchoring effect of the deposited metal which penetrates into the small pits of the surface. On substrates such as graphite and ceramics where the surface is already non-uniform, if desired, degreasing can be performed to assure a clean plating surface. Other substrate pre-treatments known to the art can be employed, if desired, and will now be evident for the above and other substrates.

The types of apparatus which may be used for the plating operation are any of the apparatus described in the prior art, such as set forth by Lander and Germer in "Plating Molybdenum, Tungsten and Chromium by Thermal deposition of Their Carbonyls," or by Powell, Campbell and Gonser in the book "Vapor Plating," John Wiley & Sons, New York, 1955, wherein a vacuum chamber is used.

Heating may be achieved by numerous methods. Generally, resistance heating, infrared heating or induction heating are used according to the nature of the substrate and the type of equipment which is employed since the equipment largely determines the heat requirements. Flat samples such as metal plates can generally be heated by resistance heating apparatus such as a hot plate. For uneven shaped objects, induction heating or infrared heating may be used, depending on the nature of the substrate.

For the plating operation of this invention, the object to be plated is heated to a temperature of 250 to 550° C. preferably 300 to 450° C. in an enclosed chamber. The system is evacuated and the plating agent is heated to an appropriate temperature wherein it possesses vapor pressure of preferably up to about 5 mm. of mercury. In most instances, the process is conducted at no lower than 0.01 mm. mercury pressure. The vapors of the plating agent are pulled through the system as the vacuum pump operates, and they impinge on the heated object, decomposing and forming the metallic coating.

In addition to the thermal decomposition techniques discussed hereinabove for decomposing the plating agents of this invention, other methods for decomposition can be employed. Such methods are decomposition of the vanadium compound of this invention by ultrasonic frequency or by ultraviolet irradiation. The former process involves essentially the same procedure as employed in Example VIII with the exception that an ultrasonic generator is proximately positioned to the plating apparatus. The vanadium compound is then heated to its decomposition threshold and thereafter the ultrasonic generator is utilized to effect final decomposition. Decomposition by ultraviolet irradiation involves essentially the same method as utilized in Example VIII with the exception that in place of the resistance furnace there is utilized for heating a battery of ultraviolet and infrared lamps placed circumferentially around the outside of the heating chamber. The substrate to be heated is brought to a temperature just below the decomposition temperature of the vanadium compound with the infrared heating and thereafter decomposition is effected with ultraviolet rays.

Although the above techniques generally employ the vanadium plating agent in its vapor phase, other techniques besides vapor phase plating can be employed. For example, the substrate to be plated can be placed in a decomposition chamber and the plating agent packed in contact with the element and thereafter heated to a temperature above the decomposition temperature of the plating agent. The volatile by-products of the decomposition reaction escape leaving an adherent deposit on the substrate.

Deposition of metal on a glass cloth illustrates the latter process. A glass cloth band weighing one gram is dried for one hour in an oven at 150° C. It is then placed in a tube which is devoid of air and there is added to the tube 0.5 gram of cycloheptatrienyl vanadium tricarbonyl. The tube is heated at 400° C. for one hour after which time the tube is cooled and opened. The cloth has a uniform metallic grey appearance and exhibits a gain in weight. The cloth has greatly decreased resistivity. An application of current to the cloth causes an increase in its temperature. Thus, a conducting cloth is prepared. This cloth can be used to reduce static electricity, for decoration, for thermal insulation by reflection, and as a heating element.

The novel compounds of this invention are particularly useful as chemical intermediates, fuel and lubricating oil additives, polymerization catalysts, combustion control additives, fungicides, herbicides, pesticides and bactericides.

Having fully defined the novel compounds of this invention, their mode of preparation and their utility, I desire to be limited only within the lawful scope of the appended claims.

I claim:
1. Cycloheptatrienyl vanadium tricarbonyl compounds having the formula

$$QV(CO)_3$$

wherein Q is a cycloheptatrienyl radical having from 7 to about 15 carbon atoms.

2. Cycloheptatrienyl vanadium tricarbonyl.

References Cited by the Examiner

UNITED STATES PATENTS 2,818,416  12/1957  Brown.
2,953,586  9/1960  Hafner _____ 117—107.2 X

FOREIGN PATENTS 832,142  4/1960  Great Britain.

MURRAY KATZ, *Primary Examiner.*

RICHARD D. NEVIUS, *Examiner.*

R. E. HOWARD, A. GOLIAN, *Assistant Examiners.*